(12) United States Patent
Maruta et al.

(10) Patent No.: US 6,840,762 B2
(45) Date of Patent: Jan. 11, 2005

(54) MICROCOMBUSTION HEATER HAVING HEATING SURFACE WHICH EMITS RADIANT HEAT

(75) Inventors: Kaoru Maruta, 17-3-206, Higashisendai 4-chome, Miyagino-ku, Sendai, Miyagi-Ken (JP); Toshiro Fujimori, Yokohama (JP)

(73) Assignees: Kaoru Maruta, Miyagi-Ken (JP); Ishikawajima-Harima Heavy Industries Co., Ltd., Tokyo (JP)

( * ) Notice: Subject to any disclaimer, the term of this patent is extended or adjusted under 35 U.S.C. 154(b) by 0 days.

(21) Appl. No.: 10/419,663

(22) Filed: Apr. 21, 2003

(65) Prior Publication Data

US 2003/0232300 A1 Dec. 18, 2003

(30) Foreign Application Priority Data

Jun. 18, 2002 (JP) .................................. 2002-176838

(51) Int. Cl.[7] .............................................. F23D 14/12
(52) U.S. Cl. ........................ 431/328; 431/170; 431/243
(58) Field of Search ................................ 431/328, 326, 431/268, 215, 170, 243, 11; 126/92 AC

(56) References Cited

U.S. PATENT DOCUMENTS

| | | | | |
|---|---|---|---|---|
| 3,525,325 A | * | 8/1970 | Perl | 431/215 |
| 3,837,329 A | * | 9/1974 | Mutchler | 126/44 |
| 4,369,029 A | * | 1/1983 | Forster et al. | 431/215 |
| 4,919,110 A | * | 4/1990 | Yokoyama | 126/39 H |
| 6,193,501 B1 | * | 2/2001 | Masel et al. | 431/170 |
| 2001/0029974 A1 | * | 10/2001 | Cohen et al. | 136/201 |

FOREIGN PATENT DOCUMENTS

JP 2-272214 A * 4/1989 ........... F23D/11/44

OTHER PUBLICATIONS

Weinberg et al., "On thermoelectric power conversion from heat re-circulating combustion systems," 29th Int'l Symposium on Combustion, Jul. 2002, 10 sheets.

* cited by examiner

*Primary Examiner*—Josiah C. Cocks
(74) *Attorney, Agent, or Firm*—Fish & Richardson P.C.

(57) ABSTRACT

A small microcombustion heater which can realize reliable combustion. The heater has a premixed gas passage which reaches a combustion chamber, and a passage for a combustion gas drawn from the combustion chamber. The passages are arranged in a spiral form in a manner such that a heating wall is provided between the passages. The width of the premixed gas passage is a quenching distance or less, where the quenching distance is determined depending on the premixed gas. The heater has two outer faces for holding the spiral passages from both sides of the upper and lower edges of the heating wall, and at least one of the outer faces is a heating surface for emitting radiant heat. Typically, the spiral passages are placed between a heat-resisting heating plate and a heat insulating plate, and an outer face of the heat-resisting heating plate functions as the heating surface.

13 Claims, 5 Drawing Sheets

MICROCOMBUSTION HEATER HAVING HEATING SURFACE WHICH EMITS RADIANT HEAT

BACKGROUND OF THE INVENTION

1. Field of the Invention

The present invention relates to a microcombustion heater having a diameter of 1 to a few centimeters.

2. Description of the Related Art

In a process for heating an object contained in a glass tube so as to produce a semiconductor or the like, the glass tube may be surrounded by several small heaters so as to form a suitable panel heater, and the heating rate of each small heater is controlled in order to control the temperature distribution of the object to be heated.

If such small heaters are of a combustion type (i.e., combustion heaters), it is generally difficult to realize stable combustion. Therefore, small electric heaters are used for manufacturing semiconductors.

On the other hand, small combustors called Swiss-roll combustors are known, which will be explained below.

FIG. 5A is a diagram showing the structure of a one-dimensional counterflow combustion heat exchanger. In the figure, reference numeral 1 indicates a heating wall, and reference numeral 2 indicates a heat insulating wall. The heating wall 1 has a high heat transfer capability, and the heat transfer capability of the heat insulating wall 2 is lower than that of the heating wall. Therefore, when these walls are made of the same material, the heating wall 1 is made thinner and the heat insulating wall 2 is made thicker.

The arrow indicated by reference numeral 3 designates the direction of the flow of a premixed gas of a fuel gas and the air, and the arrow indicated by reference numeral 4 indicates the direction of the flow of the combustion gas. Reference numeral 6 indicates the inlet of the premixed gas, and reference numeral 7 indicates the outlet of the combustion gas. The direction of the flow of the premixed gas and the direction of the flow of the combustion gas, between which the heating wall 1 is arranged, are opposite to each other. That is, the premixed gas is heated via the heating wall 1 by the combustion gas and is then burnt in the combustion chamber 8, thereby producing flame 9.

Reference numeral 10 indicates a passage for the premixed gas, and the reference numeral 11 indicates a passage for the combustion gas. The width of the premixed gas passage 10 is a specific quenching distance (explained below) or less. Therefore, the flame 9 does not flow backward through the passage 10 even when the temperature of the passage 10, heated by the combustion gas, is considerably increased.

In addition, a spark plug (not shown) for starting the combustion is provided in the combustion chamber 8.

Below, the quenching distance will be explained.

As is known, combustion is a heating phenomenon which is caused by a reaction between oxygen in the air and a fuel and which produces a combustion gas. If a gaseous fuel is used, the gaseous fuel reacts with oxygen, thereby producing a flame. The flame is produced due to an immediate reaction between oxygen and the combustion gas as free radicals, which are produced at a high temperature. The flame causes a chain reaction and thus is immediately transmitted. However, the free radicals are deactivated when they collide against a solid wall; thus, the flame cannot be transmitted through a narrow passage between solid walls. The quenching distance indicates a limit width of a narrow gap, that is, the flame cannot flow through a gap if the width of the gap is the quenching distance or less. The quenching distance relates to the combustion speed which depends on the kind of the premixed gas.

The following Table 1 indicates the relationships between the combustion speed of the premixed gas and the quenching diameter (which is used for a passage having a circular section). If the shape of the cross section of the passage is not circular, the following equivalent diameter may be used.

Equivalent diameter=(cross-sectional area of narrow gap)×4/(sum of all sides of section of the gap)

TABLE 1

| Premixed Gas | Combustion Speed ($cm^3/cm^2/s$) | Quenching Diameter (mm) |
| --- | --- | --- |
| Propane-Air | 45.7 | 2.7 |
| Hexane-Air | 39.6 | 3.0 |
| Ethylene-Air | 70.1 | 1.9 |
| Acetylene-Air | 176.8 | 0.79 |
| Hydrogen-Air | 335.3 | 0.86 |

FIG. 5B is a sectional view of a two-dimensional combustor 5, called a Swiss-roll combustor, produced by arranging the passage of the above-explaining one-dimensional combustor so as to have a spiral form, where the combustion chamber 8 is positioned at the center of the spiral.

The Swiss-roll combustor 5 is a regenerative heat exchanger which has a small heat loss even though the device size is small. The premixed gas is preheated before the combustion, so that reliable combustion can be realized and combustion can be performed even with a lean premixed gas which has approximately one-third of the specific theoretical fuel-air ratio (or the equivalent ratio).

As explained above, small heaters which are generally used for heating semiconductors are electric heaters, and the electric heater consumes expensive electrical energy which is converted into thermal energy. Therefore, this type of heater is not economical.

On the other hand, the above-explained Swiss-roll combustor 5 is a combustor which was not anticipated to be used as a device having a heating surface, where a target object is heated by radiant heat emitted from the heating surface.

SUMMARY OF THE INVENTION

In consideration of the above circumstances, an object of the present invention is to improve a Swiss-roll combustor so as to provide a microcombustion heater which is small but can realize reliable combustion by providing a heating surface as an outer face of the combustor.

Therefore, the present invention provides a microcombustion heater having a premixed gas passage for a premixed gas of a fuel and the air, where the passage reaches a combustion chamber, and a combustion gas passage for a combustion gas drawn from the combustion chamber, wherein:

the premixed gas passage and the combustion gas passage are arranged in a spiral form in a manner such that a heating wall is provided between the passages;

the width of the premixed gas passage is a quenching distance or less, where the quenching distance is determined depending on the kind of the premixed gas;

the microcombustion heater has two outer faces, between which the spiral passages are placed, for holding the spiral passages from both sides of the upper and lower edges of the heating wall; and at least one of the outer faces is a heating surface for emitting radiant heat.

The microcombustion heater may have a substantially circular shape or a polygonal shape in a plan view.

As a preferable example, the spiral passages are placed between a heat-resisting heating plate and a heat insulating plate, and an outer face of the heat-resisting heating plate functions as the heating surface.

According to the above structure, the direction of the flow of the premixed gas and the direction of the flow of the combustion gas are opposite to each other, so that sufficient heat exchange is performed between the opposite flows. Therefore, the premixed gas which is drawn into the combustion chamber 8 is sufficiently preheated, and reliable combustion can be performed. In addition, when the combustion gas is discharged, the temperature of the gas is sufficiently low; thus, thermal loss caused by the discharge of the combustion gas is small. Therefore, the microcombustion heater has a high thermal efficiency and a superior combustion stability while the device is small.

Furthermore, the width of the premixed gas passage is the quenching distance or less. Therefore, the flame does not flow backward through the premixed gas passage and thus safety is high.

In addition, one of the faces of the microcombustor, between which the spiral passages are formed, is a heating surface which emits radiant heat. Therefore, a target object can be effectively heated by the radiant heat while the temperature distribution of the target object is accurately controlled. Accordingly, the microcombustion heater has a high thermal efficiency while the device is small, and the performance of the microcombustion heater is stable; thus, the microcombustion heater can be used as a substitute for the electric heater.

BRIEF DESCRIPTION OF THE DRAWINGS

FIG. 1A is a sectional view in a plane direction and FIG. 1B is a cross-sectional view along a center line.

FIG. 5A shows a one-dimensional combustor and FIG. 5B shows a two-dimensional combustor produced by arranging the structure of FIG. 5A so as to have a spiral form.

DESCRIPTION OF THE PREFERRED EMBODIMENTS

Hereinafter, an embodiment according to the present invention will be explained with reference to the drawings.

Figure 1A:
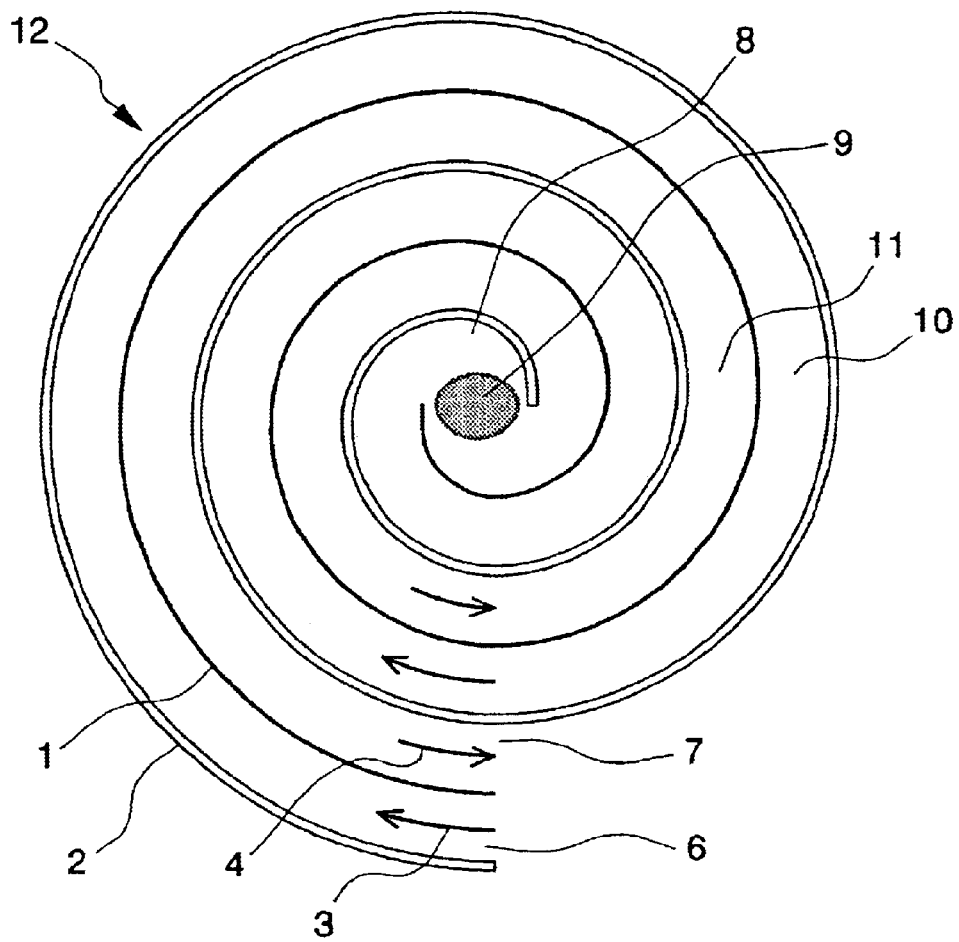
FIGS. 1A and 1B are diagrams for showing the structure of a microcombustion heater as an embodiment of the present invention, where
Figure 1B:
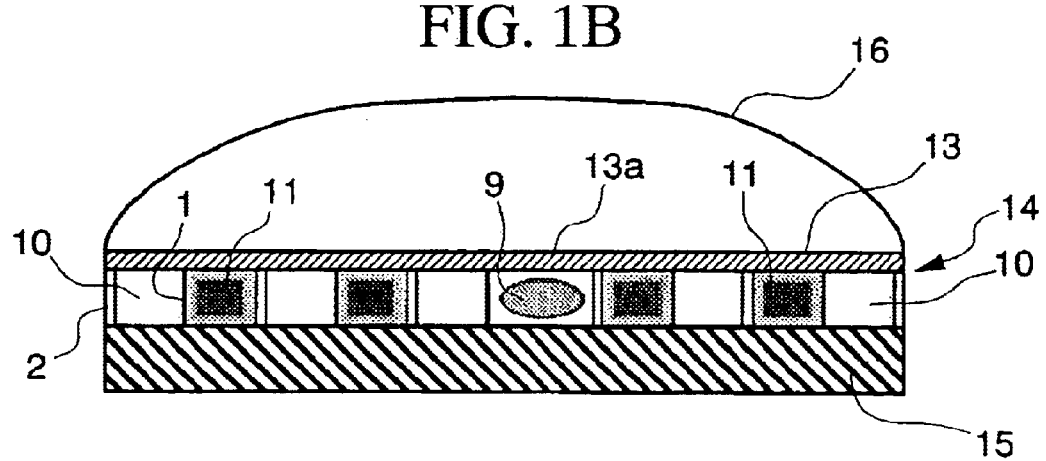
Figure 5A:
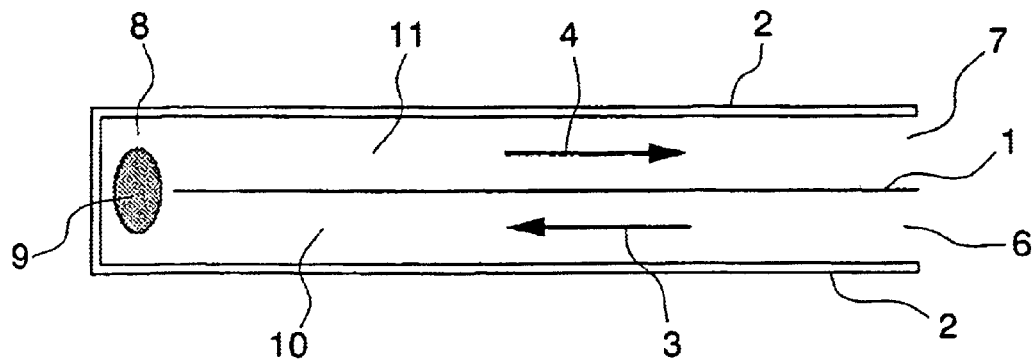
FIGS. 5A and 5B are diagrams for explaining a Swiss-roll combustor, where
Figure 5B:
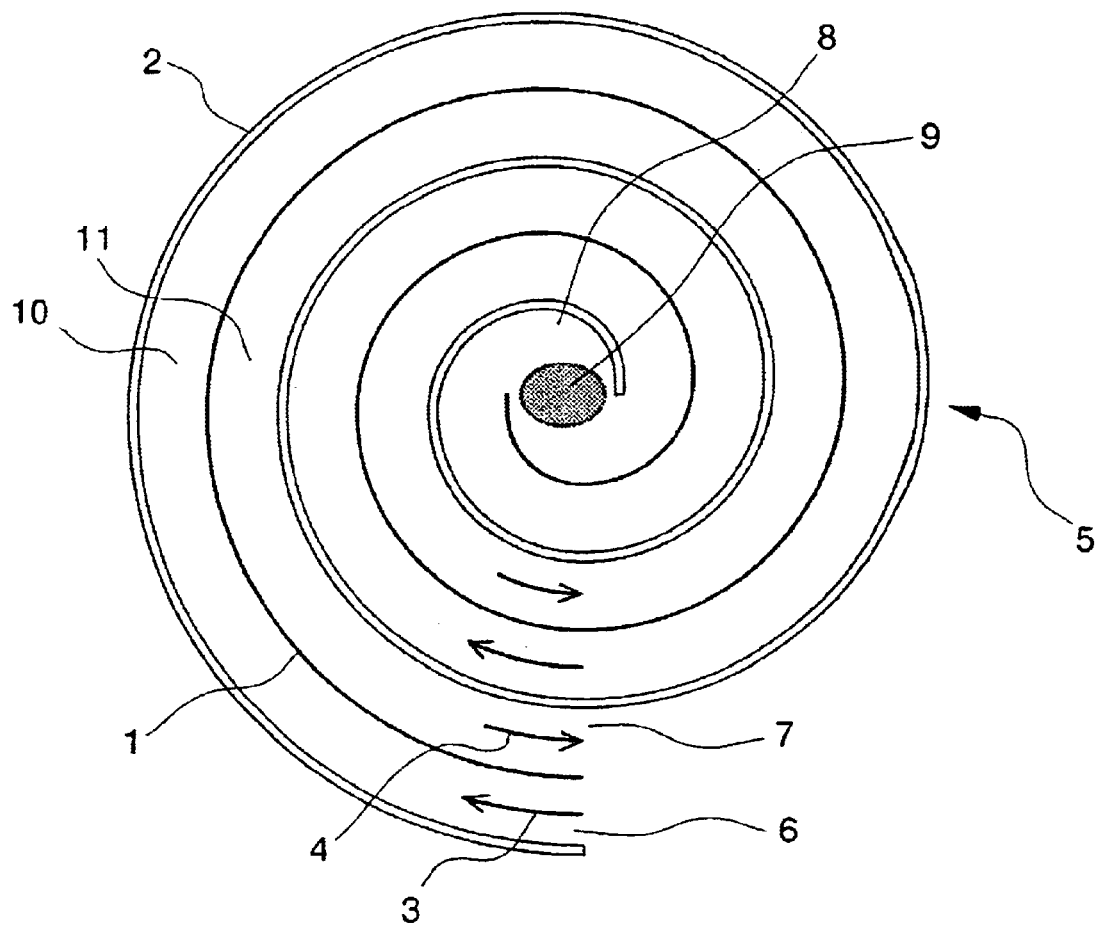
Figure 6:
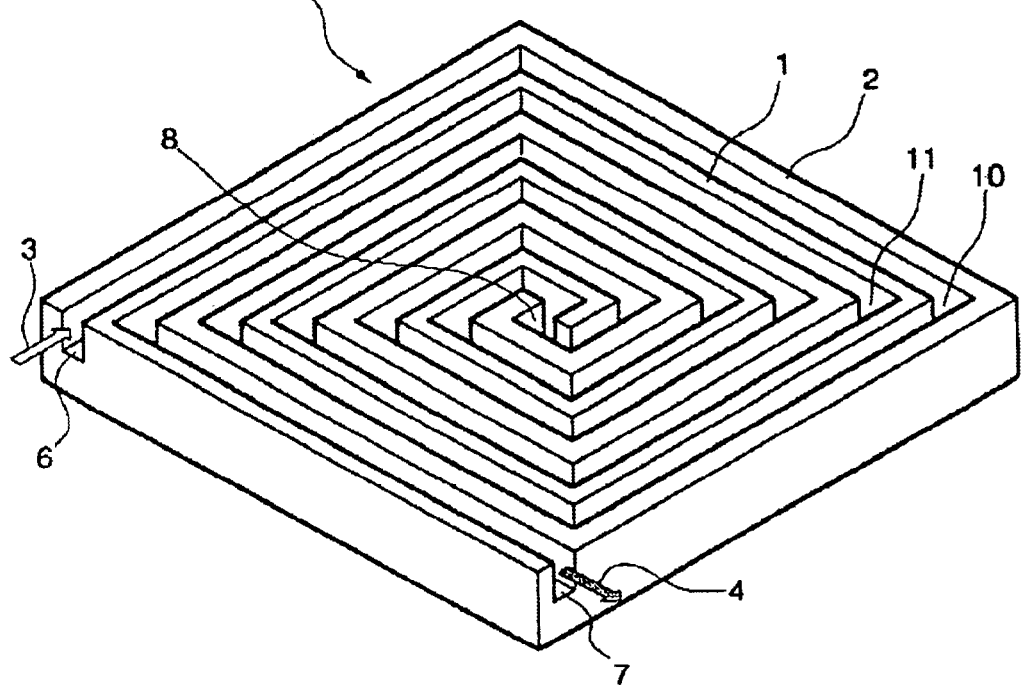
FIG. 6 is an example of a microcombustion heater, in plan view, having a polygonal shape.

FIGS. 1A and 1B are diagrams for showing the structure of a microcombustion heater as an embodiment of the present invention. FIG. 1A is a sectional view in a plane direction parallel to the heating surface (explained below), and FIG. 1B is a cross-sectional view along a center line. In these figures, parts corresponding to those in the above-explained FIGS. 5A and 5B are given identical reference numerals, and duplicate explanations are simplified or omitted.

In FIGS. 1A and 1B, reference numeral indicates a heating wall, and reference numeral 2 indicates a heat insulating wall.

As shown in the figures, the passage 10 for a premixed gas of the air and a combustion gas, which is drawn into the combustion chamber 8, and the passage 11 for a combustion gas which is drawn from the combustion chamber 8, are formed in a manner such that the heating wall 1 is placed between the passages 10 and 11. These passages 10 and 11 are arranged to have a spiral form, where the combustion chamber 8 is positioned at the center of the spiral. FIG. 1A shows a substantially circular spiral; however, the passages may be formed as a rectangular spiral form. In addition, the width of the premixed gas passage 10 is the quenching distance or less.

The microcombustor 12 (which functions as the microcombustion heater as explained below) is produced by the combustion chamber 8 and the above passages 10 and 11. Preferably, the microcombustor 12 has a circular shape having a diameter of 1 to 5 cm, or a square shape in which each side is 1 to 5 cm.

A heating plate 13 and a heat insulating plate 15 are respectively attached to the top face and the bottom face of the microcombustor 12.

The heating plate 13 is brazed to the upper edges of the heating wall 1 and the heat insulating wall 2 by using a heat-resisting brazing filler metal such as melted nickel. Here, the contact between the heating plate 13 and the upper edges of the heating wall 1 and the heat insulating wall 2 need not be extremely airtight. Therefore, if the combustor is used at a very high temperature at which the thermal resistance of the heat-resisting brazing filler metal is ineffective, only the peripheral portions of the heating plate 13 may be welded to the contact portion of the walls by using a heat-resisting alloy, where the inside area of the heating plate 13 just contacts the upper edges of the walls.

A heat-resisting stainless steel such as SUS316 and SUS310 or a heat-resisting alloy such as inconel may be used for making the microcombustor 12 and the heating plate 13.

The microcombustor 12 is small; thus, it is preferable to excavate the passages 10 and 11 on a pure material. In a preferable example using a stainless steel, the thickness of the heating wall 1 is approximately 0.3 mm and the thickness of the heat insulating wall 2 is approximately 1 mm.

In FIG. 1B, reference numeral 13a indicates a heating surface as the top face of the heating plate 13, which emits radiant heat by which a target object can be heated. The curve indicated by reference numeral 16 designates a temperature distribution of the heating surface 13a.

In addition, a spark plug (not shown) for starting the combustion is provided in the combustion chamber 8.

Below, the function of the present embodiment will be explained.

As explained above, in the microcombustor 12, the combustion chamber 8 is provided at the center of the combustor, and the passage 10 for the premixed gas of the air and a combustion gas, which is drawn into the combustion chamber 8, and the passage 11 for the combustion gas which is drawn from the combustion chamber 8, are arranged in a spiral form, where the heating wall 1 is placed between the passages 10 and 11. Therefore, the direction of the flow of the premixed gas and the direction of the flow of the combustion gas are opposite to each other, so that sufficient heat exchange is performed between the opposite flows.

Accordingly, the premixed gas which is drawn into the combustion chamber 8 is sufficiently preheated, and reliable combustion can be performed. In addition, when the combustion gas is discharged, the temperature of the gas is sufficiently low; thus, thermal loss caused by the discharge of the combustion gas is small. Furthermore, the width of the premixed gas passage is the quenching distance or less. Therefore, the flame does not flow backward through the premixed gas passage 10 and thus safety is high.

In addition, one of the faces of the microcombustor 12, between which the spiral passages are formed, is a heating surface, so that a heater 14 is realized (see FIG. 1B). Therefore, the microcombustion heater has a high thermal efficiency while the device is small. Accordingly, the performance of the microcombustion heater is stable and the combustion heater can be used as a substitute for the electric heater.

Model Analysis

Below, the model analysis which was performed for the microcombustion heater according to the present invention will be explained.

Figure 2:
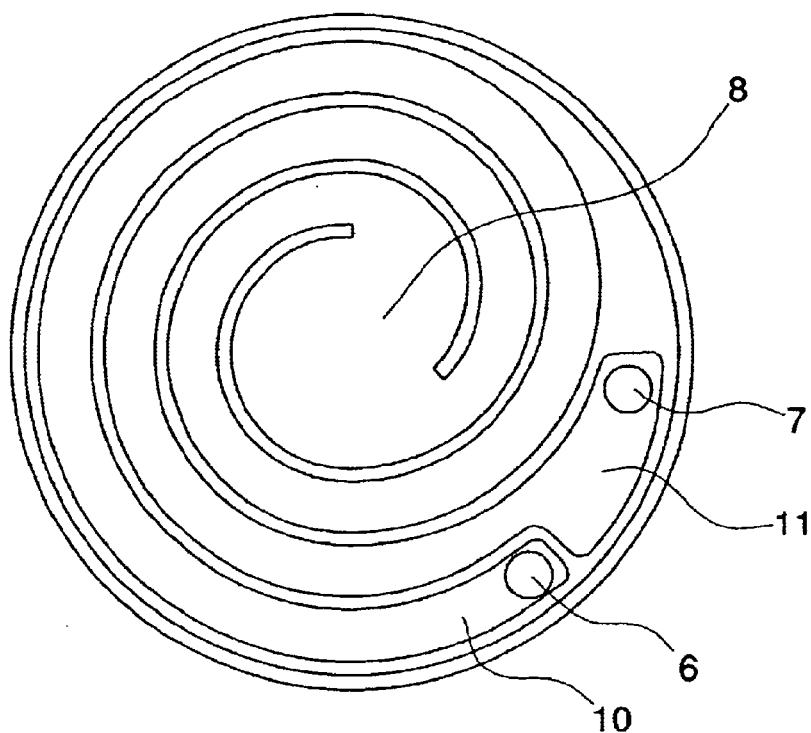
FIG. 2 is a sectional view of the microcombustion heater used in a model analysis, in a plane direction.

FIG. 2 is a sectional view of the microcombustion heater used in the model analysis, in a plane direction parallel to the heating surface of the microcombustion heater. The microcombustion heater had a diameter of 50 mm and the width and the depth of each passage were respectively 4 mm and 6 mm. The thickness of each wall was 1 mm. The premixed gas was a mixed gas of methane and the air, and the equivalent ratio was 0.6.

Figure 3:
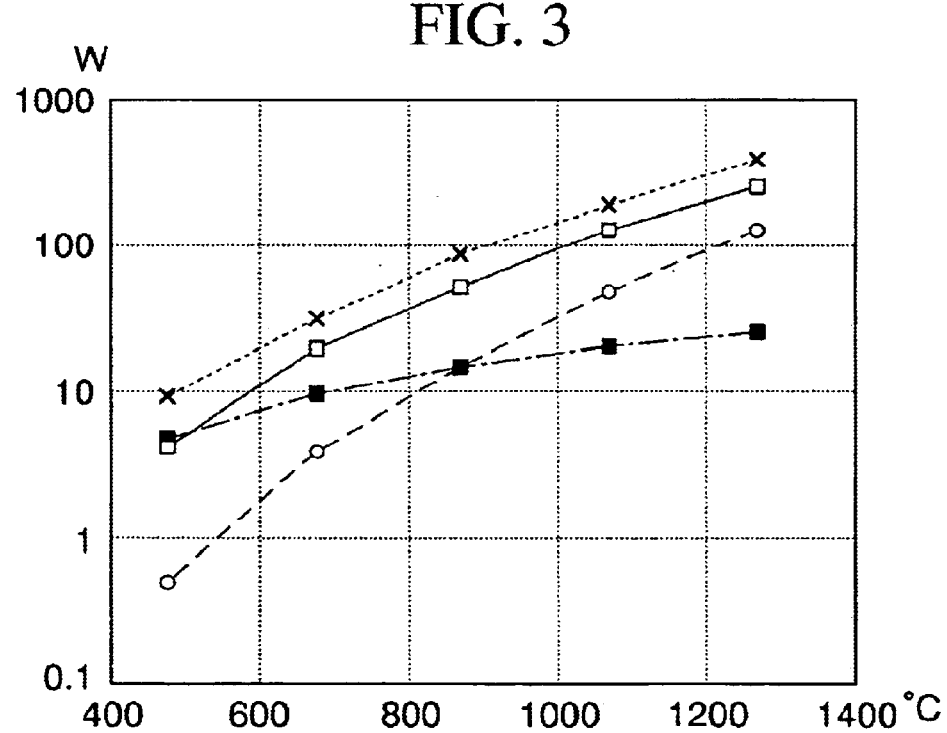
FIG. 3 is a graph showing the results of the model analysis, where the graph indicates the relationships between the heat flux and the temperature.

FIG. 3 is a graph showing the results of the model analysis. In the graph, the vertical axis indicates the heat flux (W) and the horizontal axis indicates the temperature (° C.). Explanations of the lines in the graph follow.

The dotted line, on which marks "x" are plotted, indicates the quantity of heat generated by the combustion.

The solid line, on which white rectangular marks are plotted, indicates the quantity of radiant heat which can be effectively used.

The alternating long and short dashed lines, on which black rectangular marks are plotted, indicates loss of transferred heat, which is discharged towards the atmosphere due to natural convection produced by the heating surface 13a.

The dashed line, on which white circular marks are plotted, indicates loss of heat which is discharged towards the outside of the combustor, as the exhaust of the combustion gas.

Figure 4:
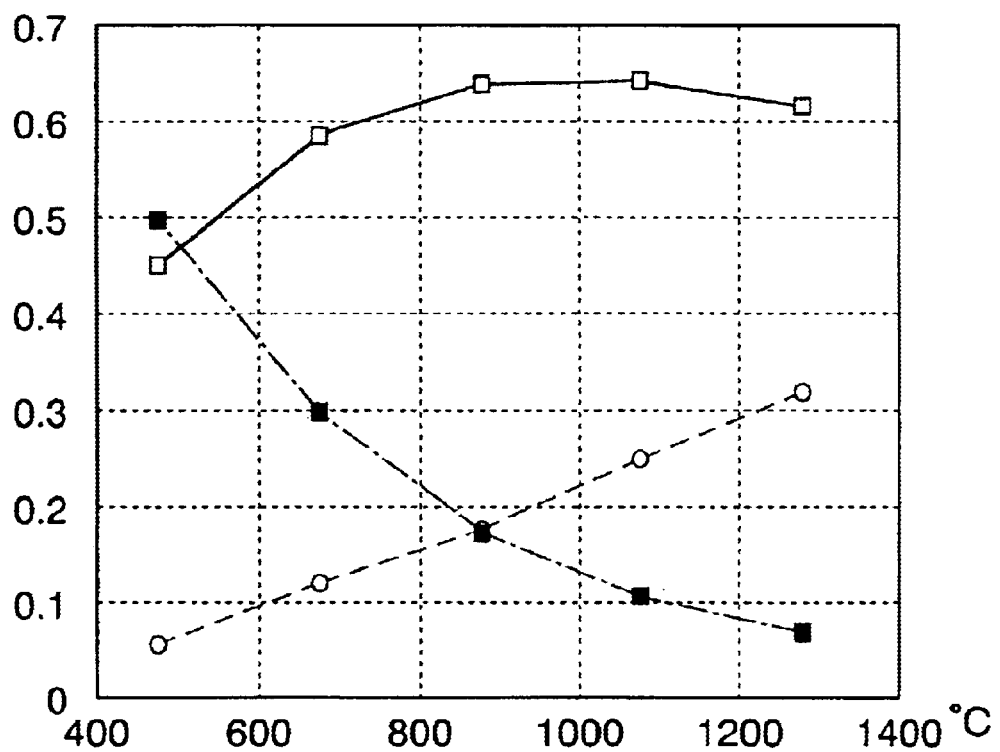
FIG. 4 is a graph showing the results of the model analysis, where the graph indicates the relationships between the temperature and the rate between the heat which can be efficiently used and each heat loss.

FIG. 4 is a graph showing the rate between the heat which can be efficiently used and each heat loss. In the graph, the vertical axis indicates the rate (here, the total quantity of heat is 1), and the horizontal axis indicates the temperature (° C.). Each line corresponding to that in FIG. 3 has the same meaning as explained above.

As clearly shown in the graphs, when the temperature of the heating surface 13a is 700° C. or higher, approximately 60 to 65% of the quantity of heat generated by the combustion can be effectively used as radiant heat for heating a target object.

The present invention is not limited to the above-explained embodiment, and variations and modifications are possible within the spirit and the scope of the invention.

What is claimed is:

1. A microcombustion heater applicable to uses including heating of a semiconductor that require an accurate temperature control, having a premixed gas passage for a premixed gas of a fuel and the air, where the passage reaches a combustion chamber, and a combustion gas passage for a combustion gas drawn from the combustion chamber, wherein:

the premixed gas passage and the combustion gas passage are arranged in a spiral form in a manner such that a heating wall is provided between the passages;

the width of the premixed gas passage is a quenching distance or less, where the quenching distance is determined depending on the kind of the premixed gas;

the microcombustion heater has a heat-resisting heating plate with an outer face, and a heat insulating plate with a generally planar inner face, the spiral passages being placed between the heat-resisting heating plate and the generally planar inner face of the heat insulating plate to be held from both sides of the upper and lower edges of the heating wall;

the heat-resisting heating plate is located on a side of the spiral passages toward an object to be heated and the heat insulating plate is located on a side of the spiral passages opposite the heat-resisting heating plate; and the outer face of the heat-resisting heating a plate functions as a heating surface for emitting radiant heat.

2. A microcombustion heater as claimed in claim 1, having a substantially circular shape in a plan view.

3. A microcombustion heater as claimed in claim 1, having a polygonal shape in a plan view.

4. A microcombustion heater as claimed in claim 2, wherein the microcombustion heater has a diameter of substantially 1 to 5 cm.

5. A microcombustion heater as claimed in claim 1, wherein the microcombustion heater has a substantially square shape in which each side has a length of substantially 1 to 5 cm.

6. A microcombustion heater as claimed in claim 1, further comprising a heat insulating wall, wherein the heating wall and the heat insulating wall are alternated with each other to provide the premixed gas passage and the combustion gas passage, and wherein the heating wall and the heat insulating wall are made of the same material, and the heating wall has a thickness smaller than that of the heat insulating wall.

7. A microcombustion heater as claimed in claim 6, wherein the heating wall and the heat insulating wall are made of stainless steel, and the heating wall has a thickness of approximately 0.3 mm and the heat insulating wall has a thickness of approximately 1 mm.

8. A microcombustion heater as claimed in claim 1, wherein the microcombustion heater has a substantially circular shape and a diameter of substantially 5 cm or less, and the premixed gas passage has a depth of substantially 6 mm or less.

9. A microcombustion heater as claimed in claim 1, wherein the microcombustion heater has a substantially square shape in which each side has a length of substantially 5 cm or less, and the premixed gas passage has a depth of substantially 6 mm or less.

10. A microcombustion heater as claimed in claim 1, further comprising an inlet of the premixed gas and an outlet of the combustion gas, wherein the inlet and the outlet are at an equal distance from a center of the microcombustion heater and are circumferentially spaced from each other.

11. A microcombustion heater as claimed in claim 1, wherein the fuel that constitutes the premixed gas with the air is one selected from the group consisting of propane, hexane, ethylene, acetylene, hydrogen, and methane.

12. A microcombustion heater unit applicable to uses including heating of a semiconductor that require an accurate temperature control, comprising a plurality of microcombustion heaters, each having a premixed gas passage for a premixed gas of a fuel and the air, where the passage reaches a combustion chamber, and a combustion gas passage for a combustion gas drawn from the combustion chamber, wherein:

the premixed gas passage and the combustion gas passage in each of the microcombustion heaters are arranged in a spiral form in a manner such that a heating wall is provided between the passages;

the width of the premixed gas passage is a quenching distance or less, where the quenching distance is determined depending on the kind of the premixed gas;

each of the microcombustion heaters has a heat-resisting heating plate with an outer face, and a heat insulating plate with a generally planar inner face, the spiral passages being placed between the heat-resisting heating plate and the generally planar inner face of the heat insulating plate to be held from both sides of the upper and lower edges of the heating wall;

the heat-resisting heating plate is located on a side of the spiral passages toward an object to be heated and the heat insulating plate is located on a side of the spiral passages opposite the heat-resisting heating plate; and the outer face of the heat-resisting heating plate functions a heating surface for emitting radiant heat; and wherein;

heating rates of the microcombustion heaters are controllable independently from each other.

13. A microcombustion heater unit according to claim 12, wherein the plurality of microcombustion heaters are arranged in a panel-like manner to provide a panel heater.

* * * * *